US008439563B1

(12) United States Patent
Alqaffas

(10) Patent No.: US 8,439,563 B1
(45) Date of Patent: May 14, 2013

(54) GAS-ACTUATED THERMOMETER

(76) Inventor: Qasem A. Alqaffas, Alsalaam (KW)

( * ) Notice: Subject to any disclaimer, the term of this patent is extended or adjusted under 35 U.S.C. 154(b) by 0 days.

(21) Appl. No.: 13/585,375

(22) Filed: Aug. 14, 2012

Related U.S. Application Data

(63) Continuation of application No. 13/301,364, filed on Nov. 21, 2011.

(51) Int. Cl.
*G01K 5/00* (2006.01)
*G01K 9/00* (2006.01)

(52) U.S. Cl.
USPC ............ 374/201; 374/190; 374/194; 116/216

(58) Field of Classification Search .................. 374/201, 374/194, 190; 116/216
See application file for complete search history.

(56) References Cited

U.S. PATENT DOCUMENTS

| | | | | |
|---|---|---|---|---|
| 1,168,518 A * | 1/1916 | Lewis | | 73/292 |
| 3,555,906 A * | 1/1971 | Ayres | | 374/105 |
| 3,965,741 A * | 6/1976 | Wachtell et al. | | 374/102 |
| 5,215,378 A * | 6/1993 | Manske | | 374/105 |
| 5,447,248 A * | 9/1995 | Rodriguez et al. | | 215/366 |
| 7,387,438 B2 * | 6/2008 | Parker | | 374/160 |
| 7,429,126 B2 * | 9/2008 | Maschietti et al. | | 374/102 |
| 2003/0185279 A1 * | 10/2003 | Wu et al. | | 374/159 |

OTHER PUBLICATIONS

U.S. Appl. No. 13/301,364, filed Nov. 21, 2001, the priority of which is claimed herein.

\* cited by examiner

*Primary Examiner* — Mirellys Jagan
(74) *Attorney, Agent, or Firm* — Richard C. Litman

(57) ABSTRACT

The gas-actuated thermometer is formed as a unitary, monolithic glass structure with a gas bulb at one end and an indicator tube extending therefrom. The bulb and tube are permanently and hermetically sealed to contain the actuating gas therein. A closed cell foam indicator resides in the indicator tube. The indicator travels along the tube in accordance with the expansion and contraction of the gas within the bulb and adjacent portion of the tube. A second gas or mechanical spring is provided in the opposite end of the tube to balance the pressure of the indicator gas. The indicator tube, and preferably also the bulb, are flattened to an elliptical or similar cross-sectional shape. This facilitates the fit of the device for use as an oral medical thermometer, and the wider cross section enables both Celsius and Fahrenheit temperature scales to be marked along the indicator tube.

7 Claims, 2 Drawing Sheets

GAS-ACTUATED THERMOMETER

CROSS-REFERENCE TO RELATED APPLICATIONS

This is a continuation of my prior application Ser. No. 13/301,364, filed Nov. 21, 2011 now pending.

BACKGROUND OF THE INVENTION

1. Field of the Invention

The present invention relates to instruments and devices for measuring temperature, and particularly to a gas-actuated thermometer containing an expandable gas volume therein that moves an indicator within the indicator tube as the temperature of the gas changes.

2. Description of the Related Art

The liquid-actuated thermometer, i.e., mercury filled, has been known for a considerable period of time. The use of the pure element mercury (Hg) in thermometers of various temperature ranges provides a number of advantages and conveniences. Pure mercury is a liquid at all ambient temperatures, from the hottest near-equatorial desert climates to winter polar temperatures. Mercury expands and contracts readily with temperature changes, thereby providing a ready indication of the temperature when the mercury is enclosed in an accurately marked tube or vial. Moreover, pure mercury is not particularly expensive to extract or refine, particularly in the relatively small amount required for the typical thermometer used to measure the ambient temperature or for medical use.

However, mercury is not without its problems and hazards. Historically, mercury was not recognized to be a hazardous or poisonous substance. More recently, however, mercury has been so recognized, particularly in its pure liquid form. While there is no hazard so long as the mercury remains completely enclosed in a hermetically sealed and unbroken container, the typical glass bulb and tube mercury thermometer is prone to breakage, and when such breakage occurs, the subsequent release of the mercury therein can prove extremely hazardous to individuals who might contact the released mercury, particularly if the thermometer is an oral thermometer that breaks in the mouth of the individual. The conventional construction of the mercury thermometer, which includes a metal bulb (for better heat transfer) that is bonded to a glass column or tube, is also somewhat prone to leakage between the metal and glass interface. Moreover, the conventional mercury thermometer is formed as a relatively small diameter tube having a nearly circular cross-section (with perhaps some slight widening of one face to act as a magnifier), in order to provide sufficient length in the tube to show the mercury expansion readily. This configuration leaves little room for the inclusion of two different temperature scales, i.e., Celsius and Fahrenheit.

As a result, various alternative temperature-measuring principles have been developed over the years. Purely electronic thermometers utilizing thermocouples have been developed relatively recently (in comparison to the well-known mercury thermometer), but earlier "hybrid" thermometers utilizing a combination of a liquid and a gas have also been developed in the past. Many, if not most, such thermometers use the expansion and contraction of a gas due to temperature change to drive a liquid in a tube that thereby indicates the temperature. In sonic cases, the liquid actuates a Bourdon tube to drive a rotating hand in a circular dial. The various devices of this type that depend upon the principle of the expansion and contraction of a gas and that are known to the inventor also use a liquid and/or a remotely located indicator that is not directly attached to or located with the temperature sensing bulb or element.

Thus, a gas-actuated thermometer solving the aforementioned problems is desired.

SUMMARY OF THE INVENTION

The gas-actuated thermometer includes a bulb or reservoir at one end and an indicator tube hermetically sealed thereto and extending therefrom. The bulb and indicator portions are preferably formed as a single, unitary structure of monolithic construction, using a strong, break-resistant glass. At least the indicator tube portion is flattened to have an elliptical or similar cross-section. The bulb is preferably similarly shaped to facilitate insertion into the mouth as an oral medical thermometer. A narrowing of the portion between the bulb and the indicator tube may be provided to facilitate retention in the mouth by a patient or subject.

The indicator tube portion of the thermometer includes a closed cell foam indicator therein. The indicator is driven within the tube portion by a gas contained within the bulb and expanding into the adjacent tube portion as its temperature increases. A second dissimilar gas or mechanical spring may be provided in the opposite end of the tube to balance the pressure of the temperature sensing gas in the bulb and adjacent portion of the tube. The gases are selected from any of a number of suitable non-toxic gaseous elements, compounds, or mixtures. The indicator tube portion is preferably marked with both Celsius and Fahrenheit scales to facilitate temperature measurements. While the gas-actuated thermometer is particularly well adapted for measuring body temperature and similar temperature ranges for medical use, it may be adapted for use in measuring other temperature ranges.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The gas-actuated thermometer provides a more rapid response than conventional mercury-filled thermometers that are commonly used to measure body temperature in the medical field and to note the temperature of the ambient air. The gas-actuated thermometer comprises a sealed tube containing a gas and a gas-impervious indicator disposed in a portion thereof. Expansion and contraction of the gas due to temperature changes drives the indicator along the length of the tube to indicate the temperature.

Figure 1:
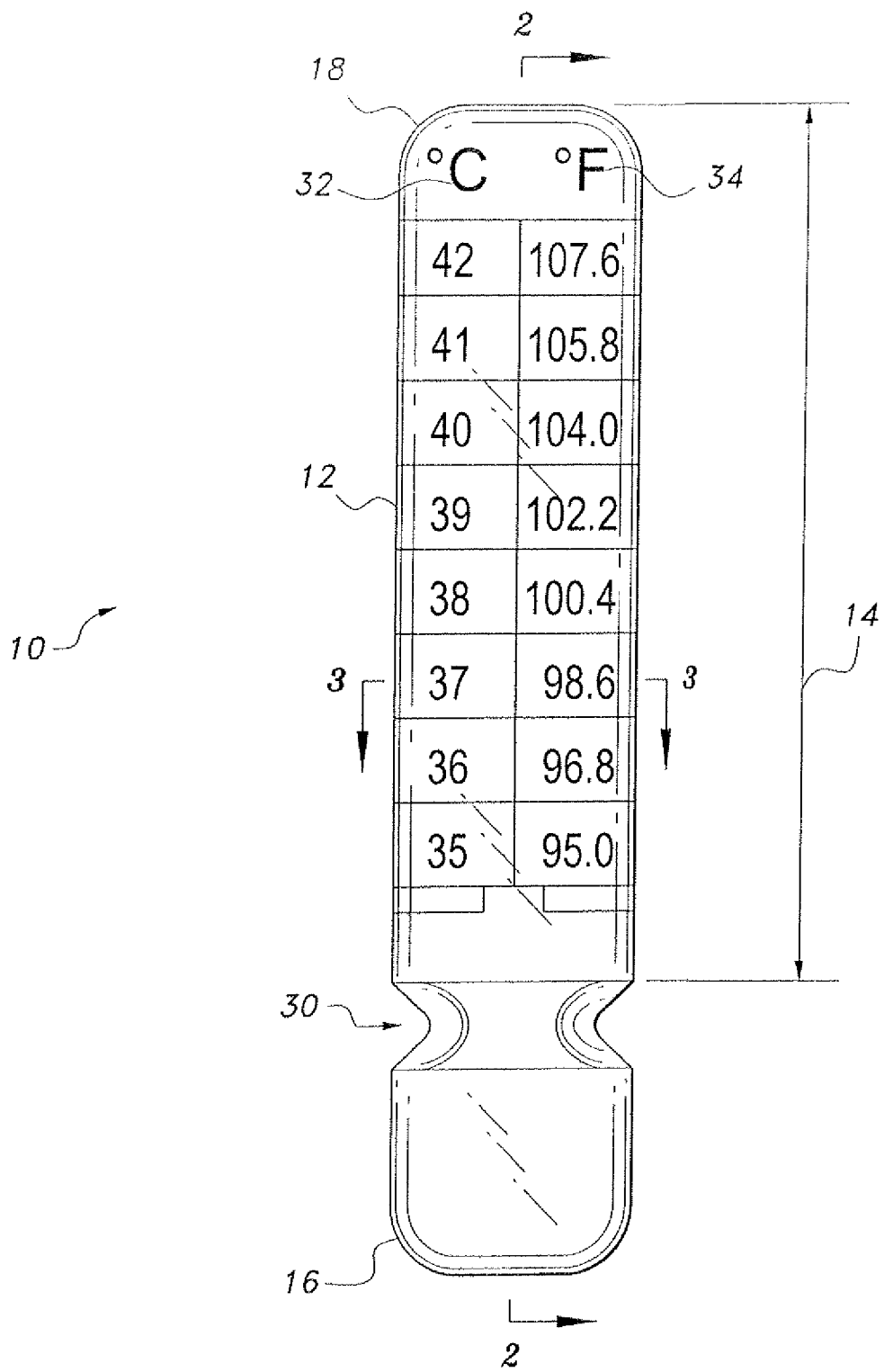
FIG. 1 is a front elevation view of a gas-actuated thermometer according to the present invention, illustrating its general features.
Figures 2, 3:
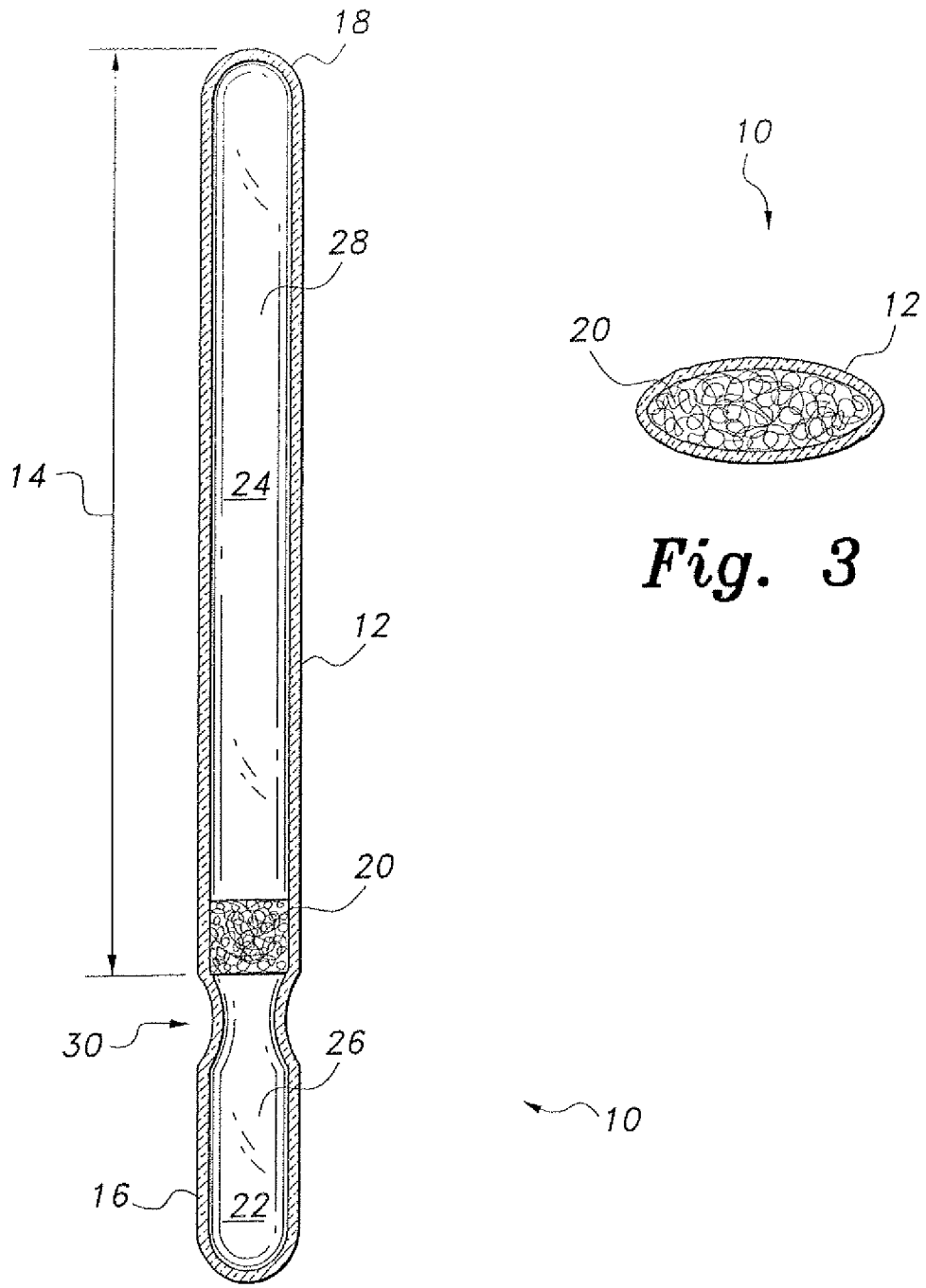
FIG. 2 is a section view drawn along lines 2-2 of FIG. 1.
FIG. 3 is a section view drawn along lines 3-3 of FIG. 1.

FIG. 1 provides a front elevation view of an exemplary embodiment of the gas-actuated thermometer 10, while FIGS. 2 and 3 illustrate section views along lines 2-2 and 3-3 of FIG. 1. The thermometer 10 is formed as a unitary, integral, hollow tubular structure having a hermetically sealed volume therein. The thermometer 10 is preferably formed of a durable glass material to resist damage, but may be formed of other transparent or translucent materials. A first portion of the thermometer 10 comprises an elongate indicator tube 12 having a length 14 defined by a hollow bulb 16 at its first end and an opposite closed distal end 18 defining its second end. The bulb 18 and indicator tube 12 define a continuous internal volume therein.

An indicator 20 is disposed within the indicator tube 12, and serves to divide the interior volume of the thermometer 10 into a first volume 22 and a second volume 24. The first volume 22 comprises the interior volume of the bulb 18 and some portion of the adjacent indicator tube 12 (depending upon the temperature) and extends to the indicator 20, while the second volume 24 comprises the interior volume of the indicator tube from the indicator 20 to the distal end 18. The first volume 22 within the bulb 18 and adjacent indicator tube 12 contains a gas 26 that expands and contracts according to Charles's Law, i.e., the volume of the gas is directly proportional to its absolute temperature. The gas 26 is preferably non-toxic to preclude injury in the event that the thermometer 10 were to be broken, and may comprise any suitable gaseous element, compound, or mixture. As the gas 26 expands due to increasing temperature, it drives the indicator 20 toward the distal end 18 of the indicator tube 12.

A corresponding second gas 28 may be provided in the second volume 24 to the opposite side of the indicator 20 from the first volume 22. The second gas 28 provides a counter-pressure to the first gas 26 to prevent the indicator 20 from being driven to the extreme distal end of the interior of the indicator tube 12 regardless of the temperature. Alternatively, a mechanical spring (not shown) or other means of controlling or governing the movement of the indicator 20 within the tube 12 may be provided. The portion of the thermometer 10 between the bulb 16 and the indicator tube 12 may be necked down or narrowed, as shown at 30, if desired. This prevents the indicator 20 from passing into the bulb portion 16 below the operative limits of the device and its temperature scale(s). The narrowed area 30 facilitates gripping the thermometer 10 between the teeth or lips of the user when the device is configured as an oral thermometer.

At least one temperature scale, and preferably two such scales calibrated in different values from one another, is provided along the length of the indicator tube 12. It will be noted in a comparison of FIGS. 1 and 2, and particularly in the sectional view of FIG. 3, that the thermometer 10 has a relatively wide, thin cross-section, preferably having an elliptical shape. This shape provides at least two advantages, in that the relatively thin shape is more comfortable in the mouth of the user when used as an oral thermometer, and the additional width provides room for two temperature scales thereon. In the exemplary embodiment of FIG. 1, a first scale 32 marked in degrees Celsius is marked along the left side of the indicator tube 12, and a second scale 34 marked in degrees Fahrenheit is marked along the opposite right side of the indicator tube 12. It will be seen that these two scales 32 and 34 may be interchanged, or temperature scales of other units or systems may be incorporated.

It will be noted that the two temperature scales 32 and 34 have a somewhat limited range that extends only a few degrees to either side of normal human body temperature, i.e., 98.6° F., or the equivalent 37° C. The exemplary thermometer 10 of FIGS. 1 through 3 is configured primarily for medical use and as an oral thermometer for measuring human body temperature. However, it will be seen that the same principles employed in the construction of such a medical thermometer 10 may be used to develop other gas-actuated thermometers having different temperature ranges.

It is to be understood that the present invention is not limited to the embodiments described above, but encompasses any and all embodiments within the scope of the following claims.

I claim:

1. A gas-actuated thermometer, comprising:
a hollow, substantially transparent indicator tube having a first end defining a closed, hollow bulb and a closed distal end opposite the bulb, the indicator tube, including the bulb, having a substantially elliptical cross section, the indicator tube defining a hollow column having a length and a volume;
an indicator slidably disposed within the hollow column, the indicator dividing the volume into a first volume extending from the first end to the indicator and a second volume extending from the indicator to the distal end;
a first gas disposed within the first volume, the gas expanding and contracting due to temperature change and causing the indicator to slide within the indicator tube accordingly, a second gas disposed within the second volume, wherein the second gas has distinct properties from the first gas thereby providing a counter-pressure to the first gas; and
at least one temperature scale disposed along the indicator tube.

2. The gas-actuated thermometer according to claim 1, wherein the indicator tube, including the bulb, has a substantially elliptical cross section.

3. The gas-actuated thermometer according to claim 1, wherein the indicator is formed of closed cell foam material.

4. The gas-actuated thermometer according to claim 1, wherein:
the indicator tube, including the bulb, is formed of glass and is a hermetically sealed unit.

5. The gas-actuated thermometer according to claim 1, wherein the at least one temperature scale disposed along the indicator tube comprises:
a first temperature scale disposed along the indicator tube, the first temperature scale being calibrated in degrees Celsius; and
a second temperature scale disposed along the indicator tube, the second temperature scale being calibrated in degrees Fahrenheit, each of the temperature scales being adapted for medical use.

6. The gas-actuated thermometer according to claim 1, wherein the indicator tube has a narrowed neck portion adjacent the bulb.

7. The gas-actuated thermometer according to claim 1, wherein the gas is selected from the group of gases consisting of non-toxic elements, compounds, and mixtures.

* * * * *